(12) United States Patent  (10) Patent No.: US 8,106,789 B2
Yang et al.  (45) Date of Patent: Jan. 31, 2012

(54) ELECTRONIC APPARATUS WITH ACTIVE POSTURE CONTROL FUNCTION

(75) Inventors: Yi-Ling Yang, Taichung (TW); Cheng-Kuo Sung, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 369 days.

(21) Appl. No.: 12/558,978

(22) Filed: Sep. 14, 2009

(65) Prior Publication Data

US 2010/0321194 A1  Dec. 23, 2010

(30) Foreign Application Priority Data

Jun. 17, 2009 (TW) .............................. 98120205 A

(51) Int. Cl.
*G08B 21/00* (2006.01)
(52) U.S. Cl. ........................................................ 340/669
(58) Field of Classification Search .................. 340/669, 340/573.7, 670, 671, 686.1
See application file for complete search history.

(56) References Cited

U.S. PATENT DOCUMENTS

| 6,529,144 | B1 * | 3/2003 | Nilsen et al. ..................... 341/20 |
| 6,970,095 | B1 * | 11/2005 | Lee et al. ...................... 340/669 |
| 7,142,418 | B2 | 11/2006 | Numano |
| 2007/0056371 | A1 | 3/2007 | Li et al. |
| 2008/0259094 | A1 * | 10/2008 | Kim et al. ...................... 345/651 |

FOREIGN PATENT DOCUMENTS

TW  I274248  2/2007

* cited by examiner

*Primary Examiner* — Phung Nguyen
(74) *Attorney, Agent, or Firm* — Muncy, Geissler, Olds & Lowe, PLLC

(57) ABSTRACT

An electronic apparatus with an active posture control function includes a body assembly, an accelerometer, a driving device and a controller. The body assembly includes a first body and a second body pivotally connected to the first body. The accelerometer mounted on the body assembly senses acceleration of the body assembly to output an acceleration signal. The driving device mounted on the body assembly drives at least one of the first body and the second body. The controller, mounted on the body assembly and electrically connected to the accelerometer and the driving device, receives the acceleration signal, judges whether the acceleration signal is higher than a predetermined level, and controls the driving device to adjust an included angle between the first body and the second body when the acceleration signal is higher than the predetermined level.

12 Claims, 4 Drawing Sheets

ELECTRONIC APPARATUS WITH ACTIVE POSTURE CONTROL FUNCTION

This application claims priority of No. 098120205 filed in Taiwan R.O.C. on Jun. 17, 2009 under 35 USC 119, the entire content of which is hereby incorporated by reference.

BACKGROUND OF THE INVENTION

1. Field of the Invention

The invention relates in general to an electronic apparatus, and more particularly to an electronic apparatus having an active posture control function.

2. Related Art

Recently, electronic apparatuses, such as mobile phones, notebook computers and personal digital assistants, are developed more and more rapidly. The market share of the electronic apparatuses becomes higher and higher. For example, when the user is using the mobile phone, the mobile phone may fall down to the floor accidentally and is thus damaged.

For example, when a foldable mobile phone freely falls down to the floor, its damaged condition depends on the state of the foldable mobile phone. The opened mobile phone falling down to the floor is damaged more seriously than the closed mobile phone falling down to the floor. In addition, the falling mobile phone whose display firstly touches the floor is damaged more seriously than the falling mobile phone whose battery cap firstly touches the floor. In order to reduce the damage, many kinds of optimum falling postures of the foldable mobile phone may be concluded.

Thus, if the falling posture of the mobile phone may be actively controlled, it is possible to provide the additional protection for the mobile phone.

SUMMARY OF THE INVENTION

It is therefore an object of the invention to provide an electronic apparatus with an active posture control function so that the posture of the falling electronic apparatus can be actively controlled and the damage can be reduced.

The invention achieves the above-identified object by providing an electronic apparatus with an active posture control function. The electronic apparatus includes a body assembly, an accelerometer, a driving device and a controller. The body assembly includes a first body and a second body pivotally connected to the first body. The accelerometer, mounted on the body assembly, senses acceleration of the body assembly to output an acceleration signal. The driving device, mounted on the body assembly, drives at least one of the first body and the second body. The controller, mounted on the body assembly and electrically connected to the accelerometer and the driving device, receives the acceleration signal, judges whether the acceleration signal is higher than a predetermined level, and controls the driving device to adjust an included angle between the first body and the second body when the acceleration signal is higher than the predetermined level.

Thus, when the electronic apparatus senses the falling, it can actively control its posture to reduce the damage caused by the falling.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
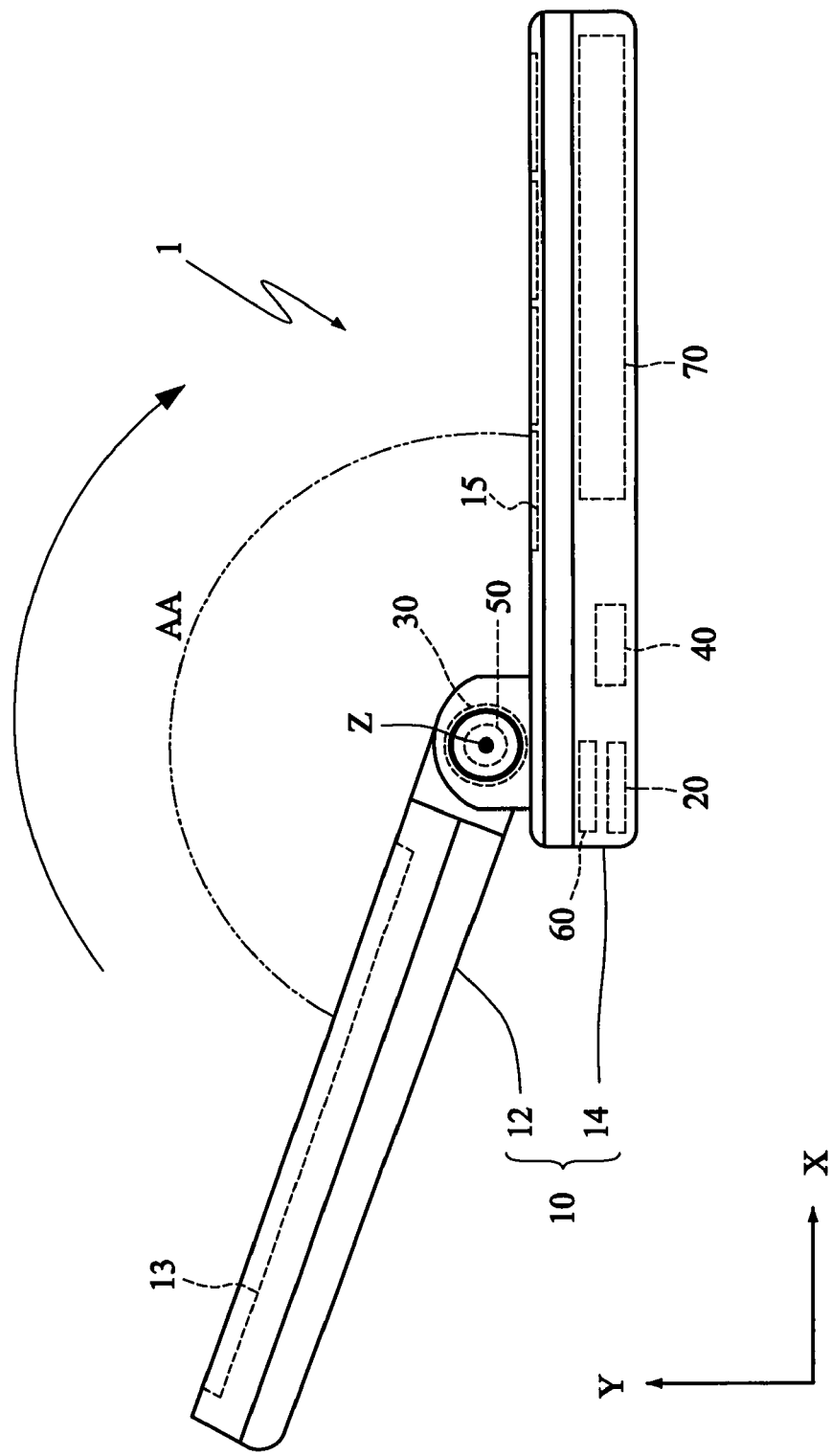
FIG. 1 is a schematic illustration showing an electronic apparatus according to a first embodiment of the invention.
Figure 2:
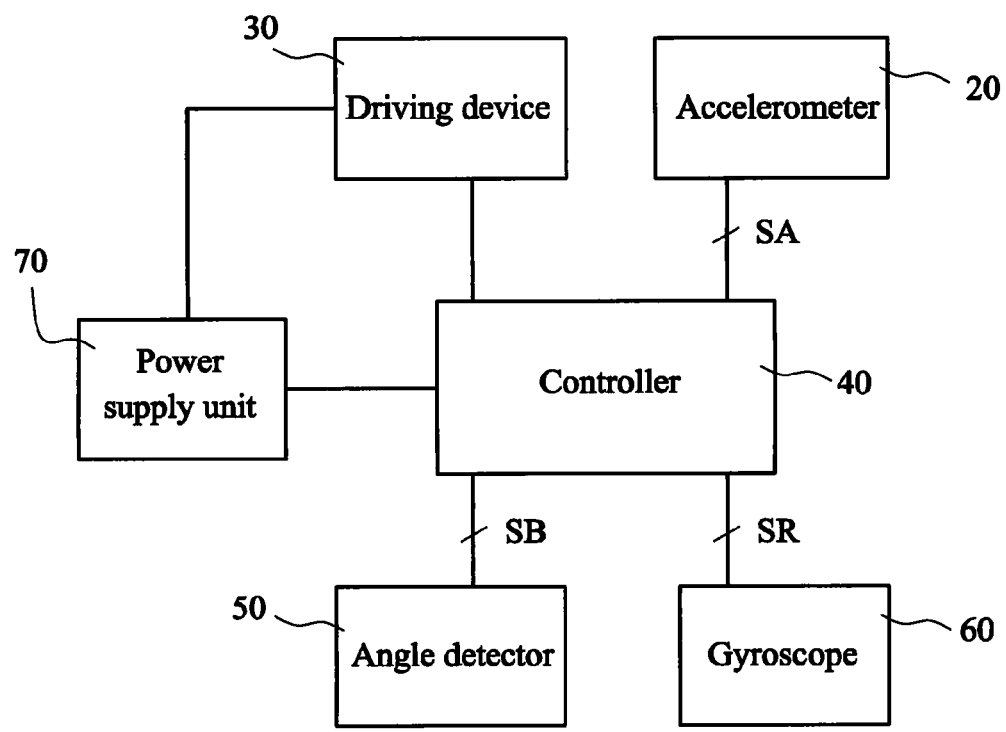
FIG. 2 is a schematic block diagram showing the electronic apparatus according to the invention.

FIG. 1 is a schematic illustration showing an electronic apparatus according to a first embodiment of the invention. FIG. 2 is a schematic block diagram showing the electronic apparatus according to the invention. As shown in FIGS. 1 and 2, the electronic apparatus with the active posture control function according to the embodiment of the invention may be a mobile phone, a notebook computer, a personal digital assistant or any other foldable electronic apparatus. The electronic apparatus includes a body assembly 10, an accelerometer 20, a driving device 30 and a controller 40.

The body assembly 10 includes a first body 12 and a second body 14 pivotally connected to the first body 12. For example, the electronic apparatus further includes a display 13 mounted on the first body 12, and a plurality of keys 15 mounted on the second body 14.

The accelerometer 20 mounted on the body assembly 10 senses acceleration of the body assembly 10 to output an acceleration signal SA. The accelerometer 20 may be mounted on the first body 12 or the second body 14.

The driving device 30 mounted on the body assembly 10 drives at least one of the first body 12 and the second body 14. The driving device 30 may be mounted on the first body 12 or the second body 14, or mounted on a pivot of the first body 12 or the second body 14. The driving device 30 usually includes a motor, which may output the power through a gear or a belt.

The controller 40, which is mounted on the body assembly 10 and electrically connected to the accelerometer 20 and the driving device 30, receives the acceleration signal SA and judges whether the acceleration signal SA is higher than a predetermined level, such as the acceleration of one gravity of the acceleration smaller than one gravity. When the acceleration signal SA is judged to be higher than the predetermined level, the controller 40 controls the driving device 30 to adjust an included angle AA between the first body 12 and the second body 14.

In addition, the electronic apparatus of the invention may further include an angle detector 50, a gyroscope 60 and a power supply unit 70.

The angle detector 50, which is mounted on the body assembly 10 and electrically connected to the controller 40, detects the included angle AA and thus outputs an included angle signal SB. The controller 40 further controls the driving device 30 to adjust the included angle AA according to the included angle signal SB.

The gyroscope 60, which is mounted on the body assembly 10 and electrically connected to the controller 40, detects a rotation state of the body assembly 10 and outputs a rotation state signal SR. The controller 40 further controls the driving device 30 to adjust the included angle AA according to the included angle signal SB.

In this embodiment, the power supply unit 70 is a battery, which is mounted on the second body 14 and electrically connected to the controller 40, the accelerometer 20, the driving device 30, the angle detector 50 and the gyroscope 60, to power the controller 40, the accelerometer 20, the driving device 30, the angle detector 50 and the gyroscope 60.

Because the electronic apparatus is less damaged when the second body 14, on which the battery 70 is mounted, firstly touches the floor, the controller 40 can control the driving device 30 to adjust the included angle AA to make the second body 14 be located below the first body 12.

Figure 3:
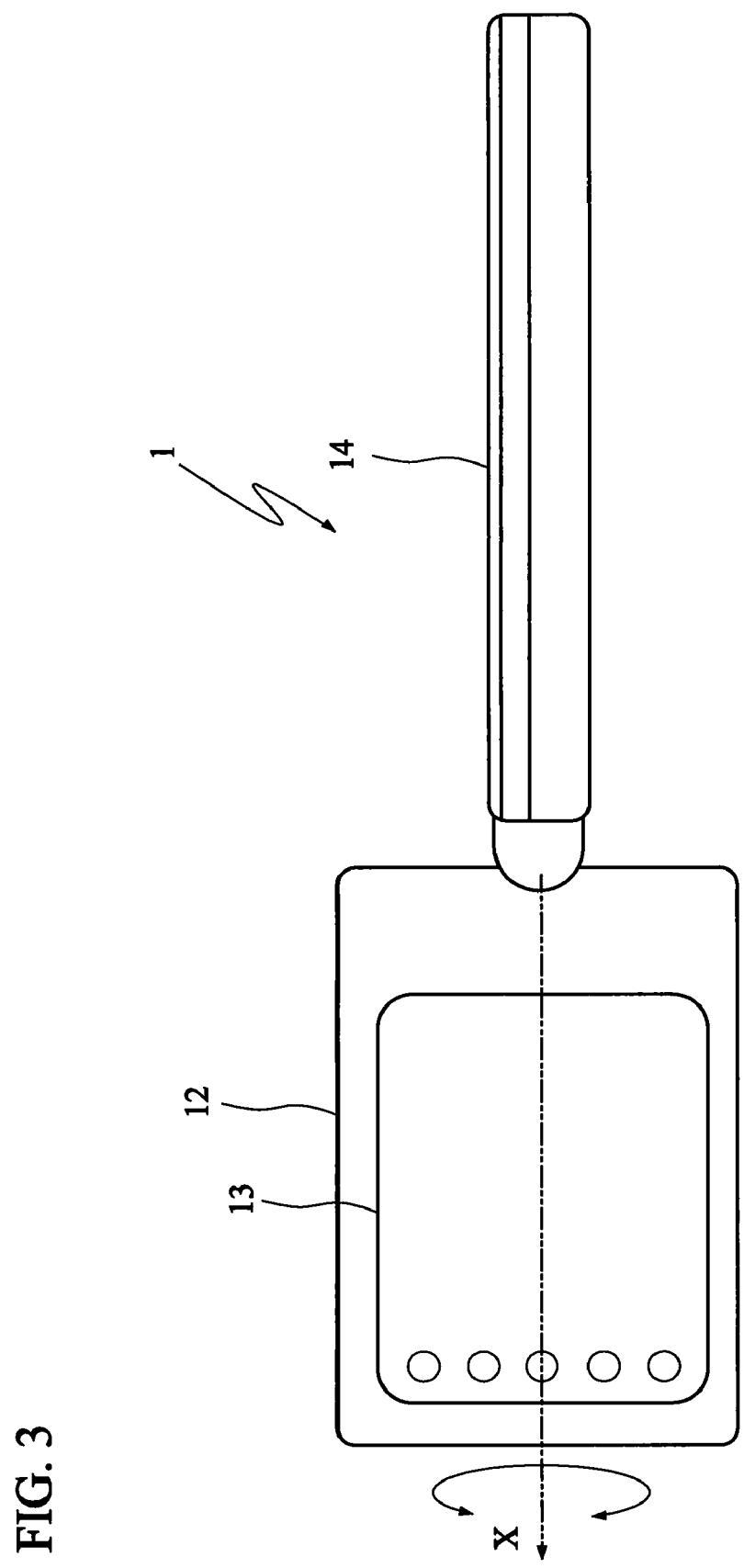
FIG. 3 is a schematic illustration showing an electronic apparatus according to a second embodiment of the invention.
Figure 4:
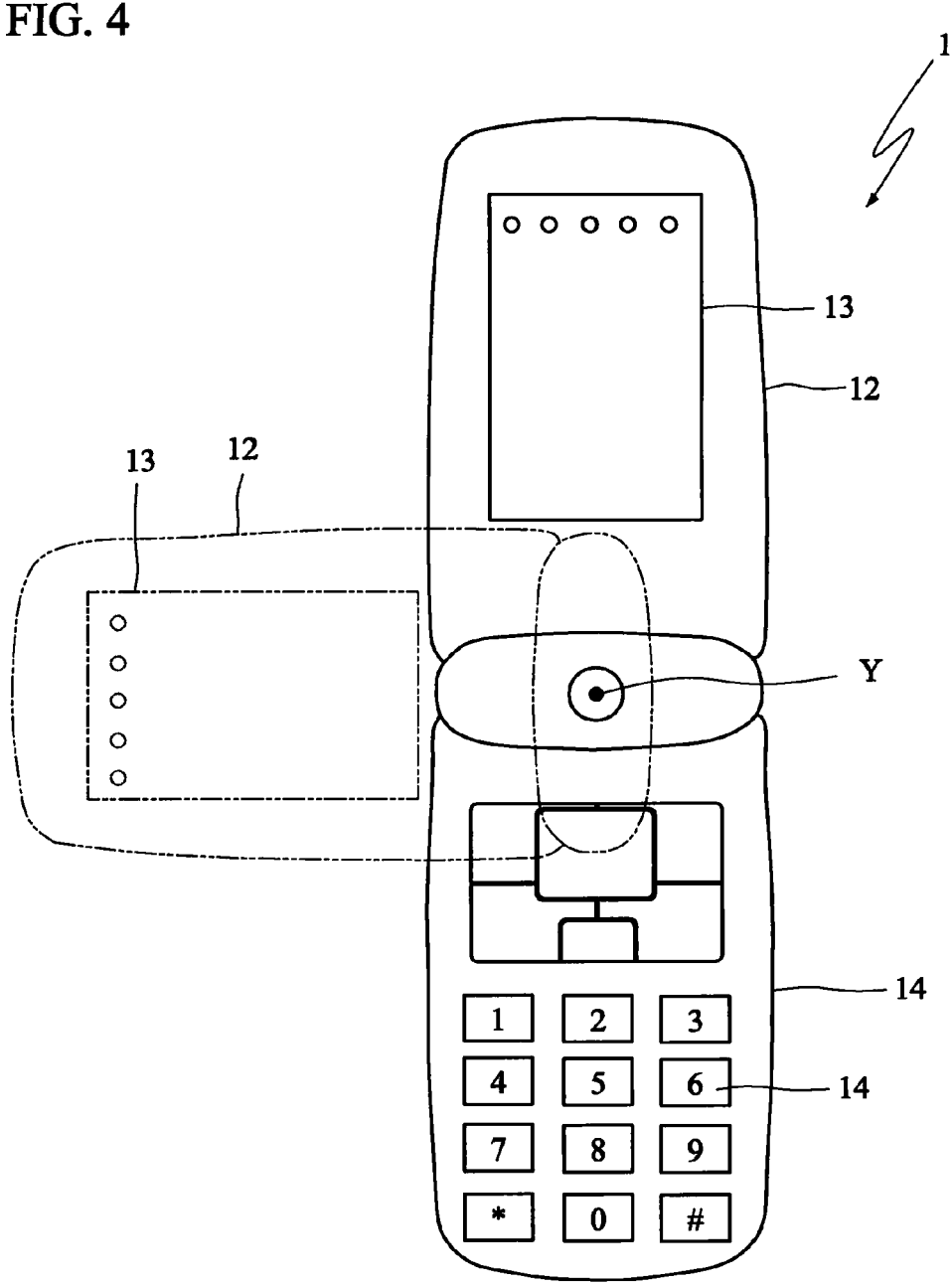
FIG. 4 is a schematic illustration showing an electronic apparatus according to a third embodiment of the invention.

In FIG. 1, the driving device 30 drives the first body 12 to rotate about the Z axis. In another example, the driving device 30 drives the first body 12 to rotate about the X axis, as shown in FIG. 3. In still another example, the driving device 30 drives the first body 12 to rotate about the Y axis, as shown in FIG. 4.

Alternatively, the driving device 30 may also drive the first body 12 to rotate about two axes (e.g., X and Z axes, X and Y axes or Y and Z axes), or about three axes (X, Y and Z axes), wherein X, Y and Z axes are perpendicular to one another.

Therefore, when the accelerometer senses the free falling motion, it outputs the signal to the controller such that the controller controls the driving device to perform an active posture control on the first body or the second body and the damage caused by the falling can be thus reduced.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An electronic apparatus with an active posture control function, the apparatus comprising:
    a body assembly comprising a first body and a second body pivotally connected to the first body;
    an accelerometer, mounted on the body assembly, for sensing acceleration of the body assembly to output an acceleration signal;
    a driving device, mounted on the body assembly, for driving at least one of the first body and the second body;
    a controller, mounted on the body assembly and electrically connected to the accelerometer and the driving device, for receiving the acceleration signal, judging whether the acceleration signal is higher than a predetermined level, and controlling the driving device to adjust an included angle between the first body and the second body when the acceleration signal is higher than the predetermined level.

2. The electronic apparatus according to claim 1, further comprising:
    an angle detector, mounted on the body assembly and electrically connected to the controller, for detecting the included angle and thus outputting an included angle signal, wherein the controller further controls the driving device to adjust the included angle according to the included angle signal.

3. The electronic apparatus according to claim 2, further comprising:
    a gyroscope, mounted on the body assembly and electrically connected to the controller, for detecting a rotation state of the body assembly and outputting a rotation state signal, wherein the controller further controls the driving device to adjust the included angle according to the included angle signal.

4. The electronic apparatus according to claim 3, further comprising:
    a power supply unit, electrically connected to the controller, the accelerometer, the driving device, the angle detector and the gyroscope, for powering the controller, the accelerometer, the driving device, the angle detector and the gyroscope.

5. The electronic apparatus according to claim 4, wherein the power supply unit is a battery.

6. The electronic apparatus according to claim 5, further comprising a display mounted on the first body, and a plurality of keys mounted on the second body, and the battery is mounted on the second body.

7. The electronic apparatus according to claim 6, wherein the controller controls the driving device to adjust the included angle such that the second body is located below the first body.

8. The electronic apparatus according to claim 4, wherein the driving device drives the first body to rotate about a first axis and a second axis perpendicular to the first axis.

9. The electronic apparatus according to claim 4, wherein the driving device drives the first body to rotate about a first axis, a second axis and a third axis, and the first axis, the second axis and the third axis are perpendicular to one another.

10. The electronic apparatus according to claim 1 being a mobile phone.

11. The electronic apparatus according to claim 1 being a notebook computer.

12. The electronic apparatus according to claim 1 being a personal digital assistant.

* * * * *